UNITED STATES PATENT OFFICE.

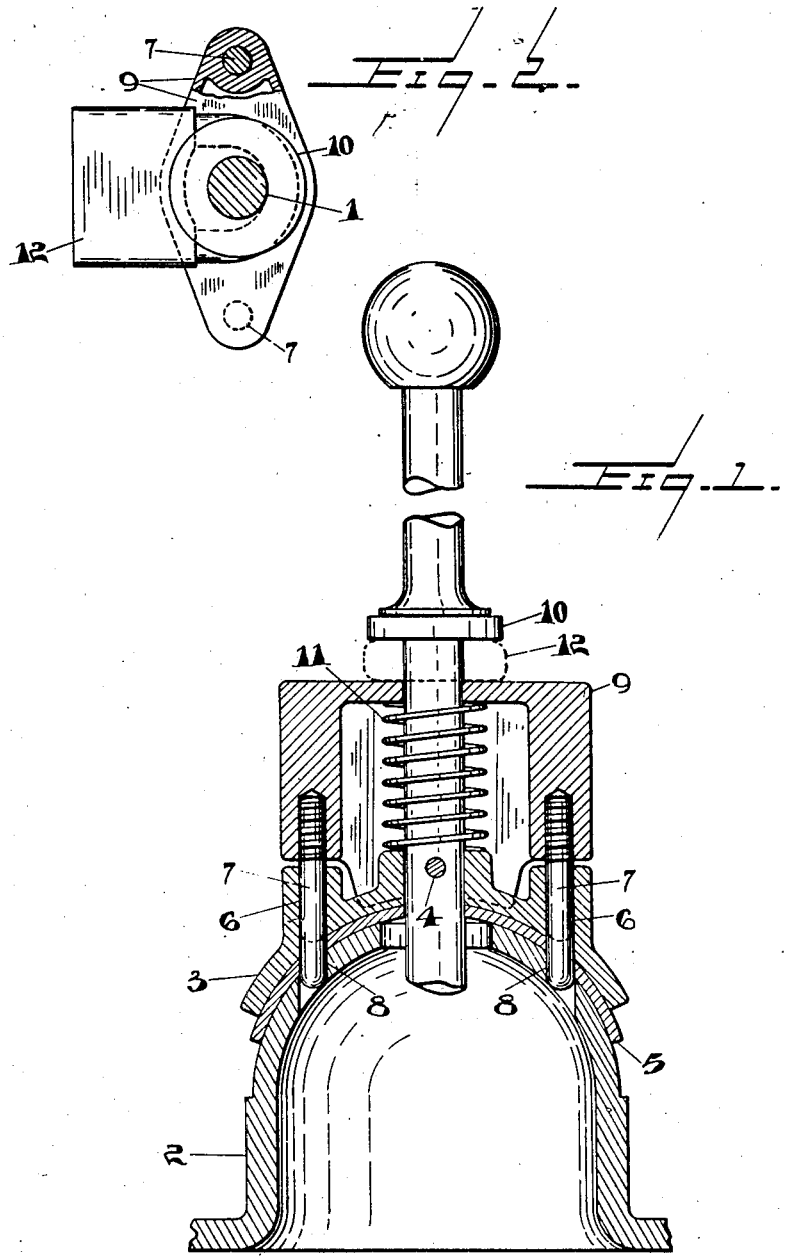

GEORGE GREEN, OF TORONTO, ONTARIO, CANADA.

LOCK FOR MOTOR-CAR GEAR-SHIFTING LEVERS.

1,348,868.  Specification of Letters Patent.  Patented Aug. 10, 1920.

Application filed March 11, 1920. Serial No. 365,010.

*To all whom it may concern:*

Be it known that I, GEORGE GREEN, of the city of Toronto, in the county of York, Province of Ontario, Canada, have invented certain new and useful Improvements in Locks for Motor-Car Gear-Shifting Levers, of which the following is a specification.

This invention relates to a locking device particularly adapted to be applied to gear shifting levers of the type in which the shifting lever moves on a ball and socket joint, and my object is to devise a simple lock involving a minimum of new or added parts, and which is locked through the medium of an ordinary padlock, which, however, is not called upon to bear any part of any strain imparted to the lever to move it from the neutral position in which it is locked.

I attain my object by means of the constructions hereinafter described and illustrated in the accompanying drawings in which—

Figure 1 is an elevation, partly in section, showing a gear shifting lever provided with an improved lock; and Fig. 2 is a plan view of the same, partly in section.

In the drawings like numerals of reference indicate corresponding parts in the different figures.

1 is a shifting lever, which is supported on the transmission gear casing by means of a ball and socket joint, which comprises the hollow ball member 2 and the socket 3, the lever being secured to the socket by means of the set screw 4. Between the ball member and the socket member is located the dust cap 5. These parts are, of course, old in the art.

The socket member is provided with holes 6, preferably surrounded by bosses, in which slide one or more pins 7. In the ball member 2 are formed holes 8, which are in alinement with the holes 6 when the lever is in a predetermined position, which will usually be the position the lever assumes when the gears are in neutral position. It is evident that when the pins are pushed down to engage in the holes 8, that the lever 1 is locked against movement, so that a car provided with this device cannot be moved under its own power. Two pins 7 are preferably employed and these are connected with the slide 9 movable longitudinally on the lever 1. On the shifting lever is formed a collar 10, which is so positioned that when the slide 9 is in contact therewith, the pins 7 are free of the holes 8 and the lever may therefore be moved in the usual manner. A coil spring 11 bears against the under side of the slide 9 and the top of the socket member 3 and tends to hold the pins 7 out of engagement with the holes 8. When the car is to be locked, locking means are placed between the collar 10 and the slide 9, thus holding the pins in the holes 8 as shown in the drawings. For this purpose an ordinary padlock 12 may be employed, the staple of the padlock being adapted to embrace the lever between the collar and the slide as shown particularly in Fig. 1.

What I claim as my invention is:—

1. The combination of a shifting lever; a ball-and-socket joint for said lever to one member of which the lever is rigidly connected, holes being formed in the members of the ball-and-socket joint which are in alinement when the lever is in predetermined position; a slide movable longitudinally on the lever; a pin secured to said slide adapted to enter the holes aforesaid to lock the ball-and-socket members together; a collar on the lever; and releasable means adapted to be locked in position between the collar and slide to hold the aforesaid pin in engagement with both members of the ball-and-socket joint.

2. The combination of a shifting lever; a ball-and-socket joint for said lever, to one member of which the lever is rigidly connected, holes being formed in the members of the ball-and-socket joint which are in alinement when the lever is in a predetermined position; a pin slidable in the outer ball-and-socket member, the hole in the inner ball-and-socket member being engageable by the said pin to lock the members together when the lever is in a predetermined position; and locking means engaging the lever and adapted to releasably hold the pin in the locking position.

Signed at Toronto Canada this 3rd day of March 1920.

GEORGE GREEN.